(12) United States Patent
Colaprisco

(10) Patent No.: US 8,361,209 B2
(45) Date of Patent: Jan. 29, 2013

(54) TURBOENGINE AIR INTAKE PROVIDED WITH A CONTROLLED FILTER SYSTEM

(75) Inventor: Marc Colaprisco, Gignac la Nerthe (FR)

(73) Assignee: Eurocopter, Marignane Cedex (FR)

( * ) Notice: Subject to any disclaimer, the term of this patent is extended or adjusted under 35 U.S.C. 154(b) by 996 days.

(21) Appl. No.: 12/323,535

(22) Filed: Nov. 26, 2008

(65) Prior Publication Data

US 2009/0139200 A1 Jun. 4, 2009

(30) Foreign Application Priority Data

Nov. 30, 2007 (FR) ...................... 07 08376

(51) Int. Cl.
*B01D 46/00* (2006.01)
(52) U.S. Cl. ............... 96/397; 55/422; 55/496; 96/417
(58) Field of Classification Search ............ 55/306, 55/385.3, 422, 496; 95/273; 96/417; 60/39.092, 60/779
See application file for complete search history.

(56) References Cited

U.S. PATENT DOCUMENTS

| 3,411,272 A | * | 11/1968 | Carmon | ............ 96/418 |
| 3,651,659 A | * | 3/1972 | Nakao et al. | ............ 62/239 |
| 2008/0245720 A1 | * | 10/2008 | Hutchinson et al. | ......... 210/236 |

FOREIGN PATENT DOCUMENTS

GB 2248195 * 1/1992

* cited by examiner

*Primary Examiner* — Duane Smith
*Assistant Examiner* — Karla Hawkins
(74) *Attorney, Agent, or Firm* — Brooks Kushman P.C.

(57) ABSTRACT

An air intake (2) for a turbine engine, and a method implemented by the air intake (2) are disclosed. The air intake (2) is provided with a filter system (10) including foldable filter elements (11), arranged at the inlet section (3) of the air intake (2). In addition, the filter system (10) includes control elements (11) that exert a force along a first direction (Y) on the free end (11') of the foldable filter elements (11) to adjust the filtering power of the filter system (10), guide members (12) of the filter system (10) serving to guide the movement of the free end (11') induced by the control elements (13).

14 Claims, 3 Drawing Sheets

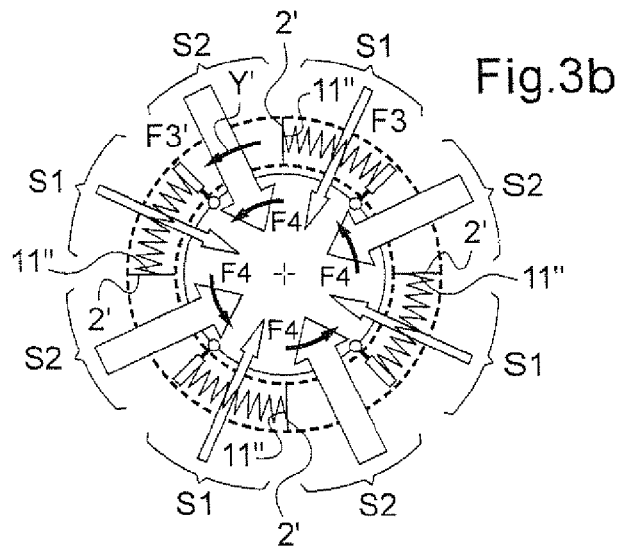
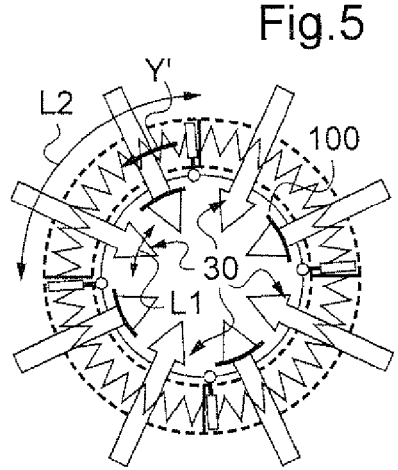
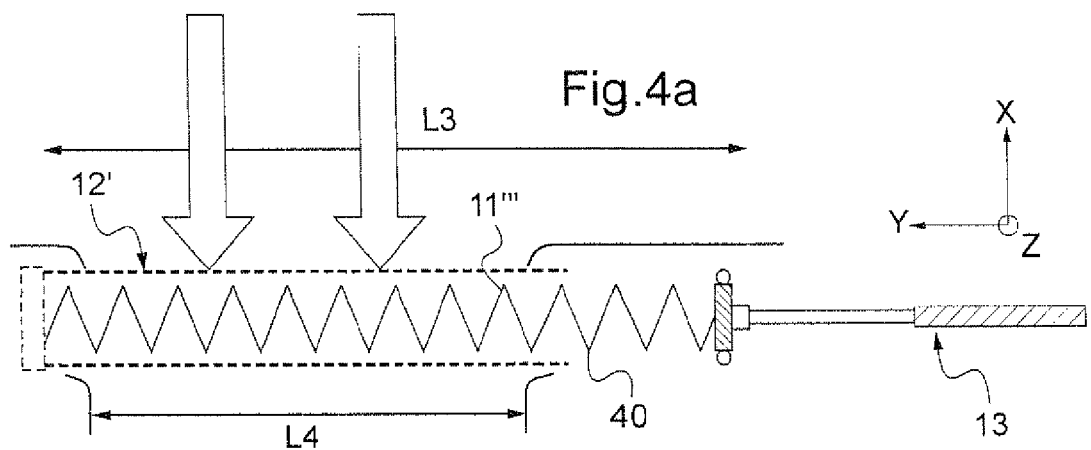
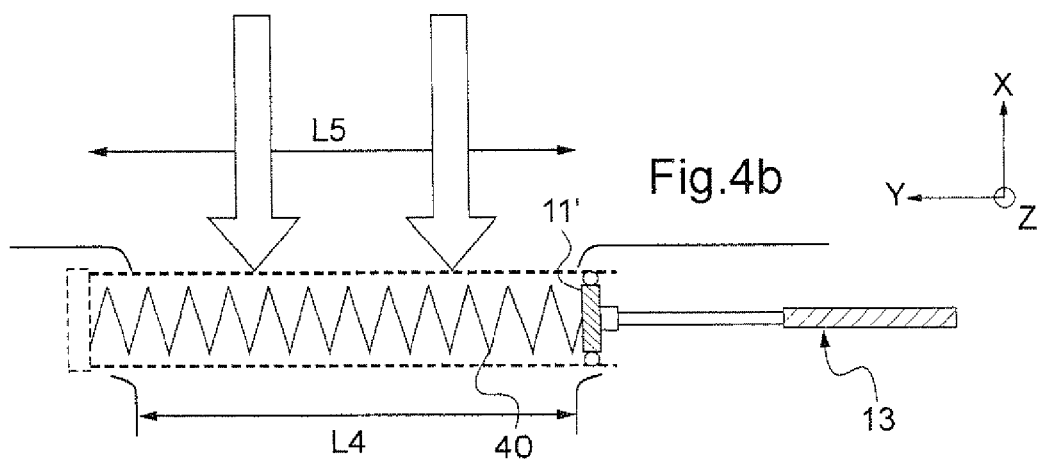

TURBOENGINE AIR INTAKE PROVIDED WITH A CONTROLLED FILTER SYSTEM

FIELD OF THE INVENTION

The present invention relates to an aircraft turboengine air intake provided with a controlled filter system. The technical field of the invention thus relates to that of turbine engine air intakes.

BACKGROUND OF THE INVENTION

Rotorcraft are called on to operate in a wide variety of environments and under conditions that may be extreme, so the turbine engine(s) of a rotorcraft must be protected in order to withstand such conditions.

Firstly, during takeoff, the blast from the lift rotor of the rotorcraft can raise dust, and even gravel, from the ground, so it is essential to protect the air intake of the rotorcraft turbine engine(s) to prevent ingestion of the above-mentioned elements. Thereafter, it is necessary to eliminate particles that are in suspension in the air being absorbed by the turbine engines of the rotorcraft, particularly if the rotorcraft is used in sandy regions where the air is saturated with particles of sand.

Secondly, rotorcraft can be called on to fly under so-called "icing" conditions. During this type of flight, ice can obstruct the air intake of a turbine engine of the rotorcraft, in part or even completely, thereby leading to a significant or even total drop in the power delivered by the engine. Similarly, ice can be ingested by the engine, and such ice is then liable severely to disturb the operation of the engine or to damage it.

Consequently, in order to be able to fly under particular conditions, i.e. in atmospheres laden with particles or ice, for example, it is appropriate to protect the engine(s) of the aircraft, and in particular the air intake(s) thereof in order to guarantee good performance of the engine.

Similarly, it can be appropriate to ensure that the engine does not ingest birds, where such ingestion can be very destructive, e.g. breaking the blades of the turbine compressor.

Aircraft manufacturers have therefore designed devices for protecting the air intakes of turbine engines so as to prevent such engines ingesting particles. The term "particle" is used for convenience to cover birds, which means that in the text below, the term "particle" could be understood as designating any element present in the air and liable to damage the engine.

Document WO 2007/090011 discloses a first filter system including flexible filter means arranged in a frame having two side borders.

The flexibility of the borders of the frame and of the filter means enables the filter system to be deformed so as to be fitted on an aircraft.

Nevertheless, that first filter system is not controllable, with the filtering power of the system remaining constant, ignoring natural degradation due to the filter means becoming obstructed while in use. However, it can be advantageous to be able to control this filtering power, e.g. for the purpose of reducing it to its minimum in the event of the filter means becoming clogged.

If the filter means become clogged, the engine will no longer be fed with air, and that will cause it to stop and possibly lead to a catastrophic situation.

Similarly, document U.S. Pat. No. 5,674,303 describes a second filter system that is not controllable.

That second filter system comprises a casing having an inside surface that defines a passage in which filter means are arranged.

In addition, a flexible seal is placed between the inside surface of the casing and the filter means. The flexible seal enables the filter means to move in the fluid flow direction along the passage under the influence of vibration, if any.

Consequently, that second filter system is well adapted to combat potentially destructive vibration, but it does not include any means enabling its filtering power to be adjusted.

Document GB 853 646 describes a third filter system arranged in the air passage of an air intake of a turbine engine.

That third filter system includes filter means arranged within a fairing. In operation, the fairing moves in translation so as to enable the filter means to be deployed.

Although effective, that third filter means presents the drawback of obstructing a large fraction of the air passage, thereby limiting the flow rate of air delivered to the engine.

In addition, since the deployment of the filter means is not capable of being modulated, the filtering power of the filter system can either be zero or at its maximum.

Finally, Document DE 2 213 352 proposes a fourth filter system for protecting a turbine engine against ingesting birds.

Filter means, specifically a broad endless link constituted by a trellis, is set into motion by rollers rotating about respective axes of rotation, driven by drive means.

In addition, a portion of the filter means is located upstream from a turbine engine.

The trellis of the filter means has two orifices, and when the two orifices are in register with each other in said portion, the incident air passes through the orifices of the filter means and reaches the turbine engine. This incident air is therefore not filtered.

In contrast, using the rollers, it is possible to offset the orifices relative to each other. The incident air then passes through the trellis of the filter means prior to reaching the engine.

Nevertheless, it is found that the fourth system is particularly bulky. In addition, the friction that exists between the rollers and the filter means is large and therefore damaging, thereby considerably limiting its lifetime.

In addition, that fourth filter system is designed to prevent elements of relatively large size being ingested, namely birds, and the filter means does not appear to be capable of being modulated, the filtering power of the filter system then being either zero or at its maximum.

OBJECT AND SUMMARY OF THE INVENTION

An object of the present invention is thus to propose an air intake for an aircraft, e.g. a helicopter, that enables the above-mentioned limitations to be overcome by being provided with a controllable filter system that is robust.

According to the invention, an air intake is provided with an air passage for guiding incident air to an aircraft turbomachine, the air intake also being provided with an inlet section through which the air penetrates into said passage, and being provided with a filter system.

The invention is remarkable in that the filter system is provided with foldable filter means arranged in the inlet section of the passage, the filter means having control means that exert a force along a first direction on a free end of the foldable filter means to adjust the filtering power of the filter system, so that the filter means can reach any filtering level lying between a zero filtering power and a maximum filtering power. In addition, the filter system possess guide means serving to guide the movement of the free end of the filter means, as induced by the control means.

Unlike the known prior art, the filter system is fitted with filter means arranged in the inlet section of the passage of the air intake, so as to avoid unduly limiting the flow of air through said passage. Consequently, in order to maximize this effect, it is advantageous to arrange the control means outside the passage.

Furthermore, the control means are suitable for adjusting very accurately the filtering power of the filter system by acting on its filter means in order to achieve any level of filtering power over a predetermined range, and not only providing one or two levels of power.

As explained below, it becomes possible to adjust this filtering power as a function of a plurality of monitoring and adjustment parameters.

Since the filter means are flexible, the guide means are important. The guide means serve to prevent the filter means from moving in an undesired direction under drive from the control means. Since the movement of the filter means is prevented from being random, it is easier to adjust the filtering power of the filter system.

Preferably, the first direction along which the control means exerts a force on the free end of the filter means and thus along which said free end is moved, presents an angle lying in the range 75 degrees to 125 degrees relative to a second direction along which air passes through said inlet section.

This ensures that none of the elements of the filter system occupy the passage of the air intake.

Furthermore, the foldable filter means includes a plane filter having fibers, e.g. cotton fibers or synthetic fibers, the plane filter being concertina-folded so that the size of the foldable filter means in the first direction can be varied.

It becomes possible to compress or extend the foldable filter means in order to vary its filtering power.

It should be understood that the expression "concertina folded" is well known to the person skilled in the art of filters, so the term is perfectly clear in this context. A concertina-folded filter thus comprises a plurality of flat segments, a segment being hinged to two adjacent segments via respective first and second longitudinal edges. By virtue of its hinges, it is then possible to enlarge or reduce the size of the filter means in a direction extending transversely to its longitudinal direction, by compressing or extending the filter means along said transverse direction.

Such filter means are found to be very robust and easy to make, specifically by concertina-folding a fiber sheet.

In order to control the movement of at least the free end of the filter means, the filter system is provided with guide means optionally including at least one grid, an outer grid placed upstream from the filter means relative to the flow direction of air through the filter system.

Advantageously, the filter system is provided with two grids that sandwich the filter means so as to constitute a supporting sheet, namely an outer grid and an inner grid located respectively upstream and downstream from the filter means relative to the flow direction of air through the filter system.

In addition, said filter system may be provided with heater means for heating said at least one grid. By way of example the heater means may be fitted with an electricity source suitable for causing an electric current to flow in each grid.

The flow of electric current then gives rise to heating of each grid so as to avoid ice becoming deposited on the trellises of the grids, in particular.

In a first embodiment, the control means compresses or extends the filter means so as to vary the size of the filter means along said first direction as a function of requirements.

The distal end of the filter means, remote from the free end thereof, is fastened to a fairing of the air intake, and the control means exert the force on the free end of the filter means, so that the control means necessarily cause the filter means to be compressed or extended, thereby enabling its filtering power to be varied.

For example, by pushing the free end along the first direction, the control means can compress the filter means so as to reduce filter size in said first is direction, whereas by pulling on said free end, the control means extend the filter means so as to increase filter size in said first direction.

In a second embodiment that constitutes an improvement over the first embodiment, when said first size is maximized, the filter means project from the inlet section.

In a third embodiment, the control means move the filter means along the first direction, but without modifying the shape thereof.

The control means neither compress nor extend the filter means, but move the filter means as a whole.

Consequently, when the filter means are in the maximum filtering position, the filter means obstructs the entire inlet section of the passage. The incident air necessarily passes through the filter means prior to reaching the turbine engine.

In contrast, when the control means move the filter means, the filter means obstruct the inlet section in part only. Consequently, the filtering power of the filtering system diminishes insofar as non-filtered air can reach the engine.

By moving the filter means as a whole, it is possible to filter none of the incident air that passes through the air intake to feed the engine.

In a first variant of the embodiments of the invention, the filter means are contained in a plane.

Consequently, the control means include at least one actuator arranged in said plane in order to exert a force on the filter means along the first direction.

In a second variant of the embodiments of the air intake, the filter means include at least one filter portion occupying a circular arc, and possibly four portions each occupying an angular field of 90 degrees. This second variant is particularly well adapted to a turbine engine that is fed radially with air.

For example, the control means then comprise an actuator together with a hoop secured to the free end of each of the filter portions of the filter means, the actuator being suitable for causing the hoop to perform turning movement about its center of rotation.

The control means can then cause the hoop to turn, with the hoop then exerting a force on each free end of each filter portion of the filter means.

The present invention also provides a method enabling the above-described air intake to be operated, in order to take maximum advantage from its innovations.

Thus, according to the invention, a method of filtering the air entering an aircraft turbine engine with the help of an air filter fitted with a filter system comprising filter means, guide means, and control means, is remarkable in that during an adjustment stage, when monitoring means for monitoring said air intake detect the non-desired presence of particles in the air on the basis of information relating to at least one monitoring parameter and delivered by at least one sensor, the monitoring means cause the filtering power of the filter means to be increased or decreased as a function of at least one adjustment parameter.

The air is then filtered accurately by the filter means as a function of monitoring and adjustment parameters.

More precisely, said at least one monitoring parameter is selected from the following first list comprising:
- the size of the particles contained in the air upstream from the filter means;
- the number of particles contained in the air upstream from the filter means;
- the size of the particles contained in the air downstream from the filter means;
- the number of particles contained in the air downstream from the filter means; and
- the head loss generated by the filter means.

Thereafter, if particles are detected in the air by a sensor, the monitoring means cause the control means to exert a force on the filter means along a first direction.

In order to determine accurately the filtering power that is to be achieved in a particular situation, the monitoring means receive information relating to at least one adjustment parameter selected from the following second list that comprises:
- the size of the particles that can be accepted by the turbine engine;
- the atmospheric conditions outside the aircraft, such as the outside air pressure, the outside air temperature, and the altitude of the aircraft; and
- the health of the turbine engine, such as the estimated service life remaining for the turbine engine.

Furthermore, during a preliminary stage prior to the adjustment stage, for a twin-engine aircraft, if only one of the engines is operating, then the monitoring means activate the control means to minimize the filtering power of the filter means. This filtering power can become zero, with the filter means no longer filtering the air entering the passage of the air intake of the engine.

In addition, during an optional stage, when means for monitoring said air intake detect the presence of ice, said monitoring means activate heater means to heat a grid of the guide means for guiding the filter means.

Finally, during a monitoring stage, when means for monitoring the air intake detect that the filter means have become obstructed at least in part, the monitoring means activate the control means of the filter system to remove the obstruction from the filter means.

For example, the monitoring means may cause the control means to cause the filter means to move suddenly, thereby generating impacts suitable for unobstructing the filter means.

If the desired result is not obtained, then the monitoring means cause the control means to act on the filter means so that the air entering into the inlet section of the passage is no longer filtered.

BRIEF DESCRIPTION OF THE DRAWINGS

The invention and its advantages appear in greater detail from the following description with embodiments given by way of illustration with reference to the accompanying figures, in which:

FIGS. 3a and 3b are sections of an air intake in a second variant of the first embodiment, shown in two distinct positions;

FIGS. 4a, 4b, and 4c are sections of an air intake in a first variant of a second embodiment, shown in three distinct positions;

FIG. 5 is a section of an air intake in a second variant of the second embodiment;

Elements present in more than one of the figures are given the same references in each of them.

MORE DETAILED DESCRIPTION

It can be seen that three mutually orthogonal directions X, Y, and Z are marked in the figures.

The X direction is said to be "longitudinal", relative to the turbine engine, and another direction, Y, is said to be "transverse".

The transverse direction, Y, is referred to as the "first" direction in the frame of reference associated with the filter system; while the longitudinal direction, X, is also referred to as the "second" direction.

Finally, a Z direction is referred to as "elevation" and corresponds to the height dimensions of the structures described.

Figure 1:
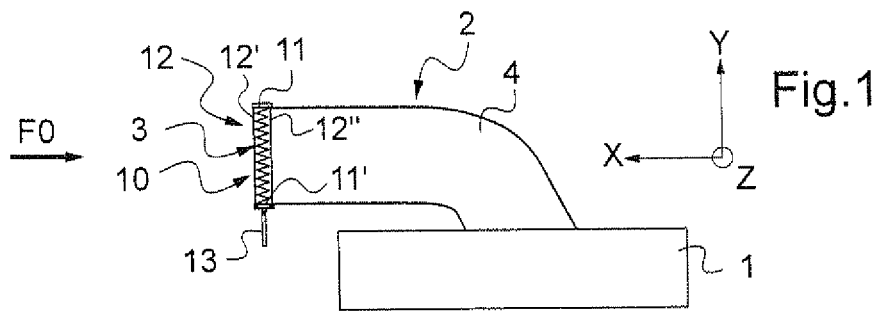
FIG. 1 is a diagrammatic section of an air intake of the invention.

FIG. 1 is a diagrammatic section of an air intake 2 of an aircraft turbine engine 1.

The air intake 2 takes in air via its inlet section 3 and directed towards the turbine engine 1 via an air flow passage 4.

In order to avoid feeding the turbine engine with polluted air that contains particles, e.g. of sand, the air intake 2 is fitted with a filter system 10 provided with filter means 11 arranged at the inlet section 3. The air that passes through the filter means is filtered so as to avoid transporting harmful particles to the turbine engine 1.

Consequently, the filter means 11 are constituted, for example, by a sheet of fibers, such as cotton fibers or synthetic fibers, the sheet being folded concertina-like, as shown in FIG. 1.

Because of this concertina folding, it is possible to deform the filter means 11, in particular by compressing it or extending it, so as to vary its size along the first direction Y.

In addition, in order to control its air-filtering power, the filter system 10 is provided with control means 13 that exert a force on a free end 11' of the filter means in a first direction Y.

It should be observed that the first direction Y along which a force is exerted on the filter means 11 is perpendicular to a second direction X followed by the air entering into the inlet section 3, as represented by arrow F0.

In addition, it is appropriate to control the movement of the filter means 11 as generated by the force delivered by the control means 13. Consequently, the filter system 10 includes guide means 12. By way of example, the guide means 12 possess an outer grid 12' and an inner grid 12", disposed respectively upstream and downstream from the filter means 11, the terms "upstream" and "downstream" being defined relative to the flow direction F0 through the filter system 10.

By sandwiching the filter means between the outer and inner grids 12' and 12", the movement of the free end 11' of the filter means is well guided.

Alternatively, it is possible to use only the outer grid, the filter means being guided for example by a metal track of said outer grid that passes through the filter means. By analogy, the assembly comprising the track and the filter means operates like an assembly comprising a curtain rod and a curtain.

Advantageously, it is possible to provide means for heating the filter system so as to increase its effectiveness when used under icing conditions. These heater means (not shown in the figures) deliver an electric current that passes through at least the outer grid 12' in order to heat it and avoid icing.

Finally, it can be seen that the control means 13 is not arranged in the passage 4 of the air intake, but rather outside the passage so as to avoid unduly limiting the flow rate of air along the passage 4.

With reference to FIGS. 2a, 2b, 3a, and 3b, in a first embodiment, the control means compress or extend the filter means so as to vary the size thereof along the first direction depending on the need to modify the filtering power of the filter system.

Figure 2A:
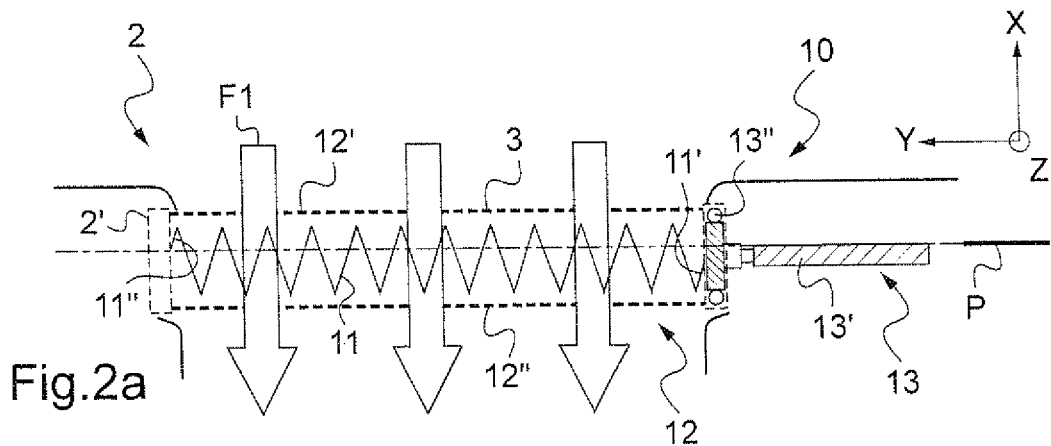
FIGS. 2a and 2b are sections of an air intake in a first variant of the first embodiment, shown in two distinct positions.
Figure 2B:
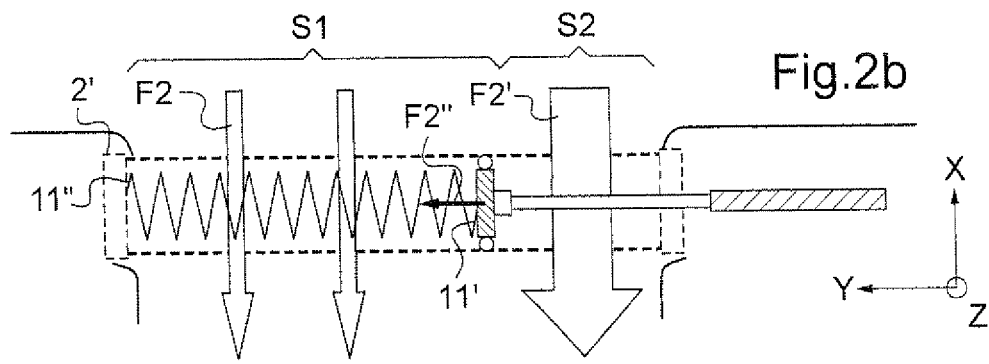

More precisely, FIGS. 2a and 2b relate to a first variant of the first embodiment. The filter means are then contained in the plane P defined by the first direction Y and the elevation direction Z.

The outer and inner grids 12' and 12" are then parallel to the plane P and an actuator 13' of the control means 13 is also contained in the plane P.

Optionally, the actuator 13' has two wheels 13" to make it easier to move between the outer and inner grids 12' and 12" of the guide means 12. The guide means guide not only the filter means 11, but also the control means 13, or at least the actuator 13' thereof.

In a first filtering position, shown in FIG. 2a, the filter means 11 cover the entire inlet section 3 of the air intake. The air reaching the turbine engine is therefore necessarily filtered.

In contrast, and with reference to FIG. 2b, if it is found necessary to reduce the filtering power of the filter system in order to increase the flow rate of air delivered to the turbine engine or because the air contains little pollution, the control means exert a force on the free end 11' of the filter means 11 in the rectilinear first direction Y.

The distal end 11" of the filter mean 11 is fastened to a fairing 2' of the air intake, so the free end 11' moves along the arrow F2". The filter means are then compressed, the size thereof in the first direction Y being reduced.

As a result, a first fraction S1 of the inlet section 3 is covered by the filter means, said filter means locally generating stronger filtering than before as a result of the compression applied thereto.

Nevertheless, a second fraction S2 of the inlet section 3 is no longer covered by the filter means. Air passing through this section fraction S2 of the inlet section 3 along arrow F2' is therefore not filtered, whereas air passing through the first fraction S1 of the inlet section 3 along arrow F2 is filtered.

It will readily be understood that this phenomenon is reversible, the control means being capable of extending the filter means so as to return to the situation shown in FIG. 2a.

It should be observed that it is possible to compress the filter means completely so that the inlet section 3 is no longer covered at all by the filter means.

To summarize, the size of the filter means along the first direction can be set at any value lying in the range zero to the size of the inlet section 3 in the first direction Y. It is therefore possible to adjust the filtering power of the filter system 10 very accurately.

Figure 3A:
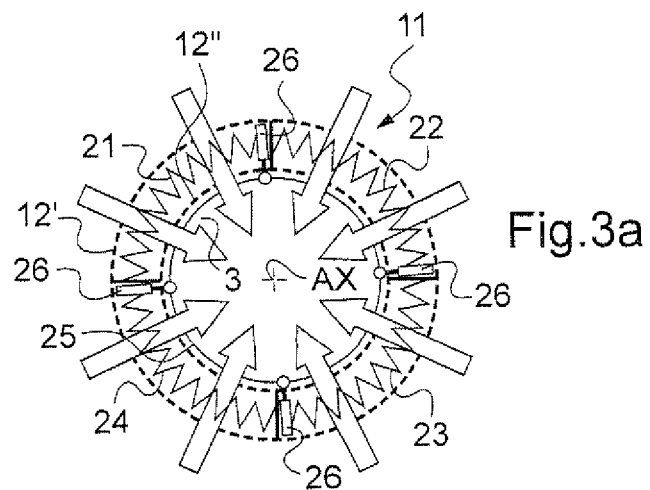

FIGS. 3a and 3b show a second variant of the first embodiment. The filter means then include at least one filtering portion 21, 22, 23, or 24 occupying a circular arc, and more precisely there are four portions in FIGS. 3a and 3b.

The control means are then provided with a hoop 25 to which the free ends of each of the filter means are secured by fastener means 26.

In addition, the control means possess an actuator (not shown in the Figures) capable of imparting a turning movement to the hoop 25 about its axis of rotation AX that is normal to the plane of FIGS. 3a and 3b.

In a first filtering position shown in FIG. 3a, the portions 21, 22, 23, and 24 of the filter means 11 cover the entire inlet section 3 of the air intake. The air that reaches the turbine engine is therefore necessarily filtered.

In contrast, and as shown in FIG. 3b, it can be found necessary to reduce the filtering power of the filter system, e.g. in order to increase the flow rate of air delivered to the turbine engine in the event of the filter means becoming partially clogged.

Consequently, the control means exert a force on the free end 11' of the filter means 11 in the first is direction Y'. Unlike the first variant, this first direction Y' is no longer rectilinear, but is curved in such a manner that the free end of each portion of the filter means moves along the circular arc described by the portion.

The distal end 11" of each portion 21, 22, 23, or 24 of the filter means 11 is fastened to a fairing 2' of the air intake, so each free end 11' moves along an arrow F4. Each portion of the filter means is then compressed, with its size along the first direction Y' being reduced.

Consequently, a first fraction S1 of the inlet section 3 is covered by the filter means, the filter means then locally generating greater filtering than before because of the compression to which it has been subjected.

Nevertheless, a second fraction S2 of the inlet section 3 is no longer covered by the filter means. The air passing through the second fraction S2 of the inlet section 3 along arrow F3' is therefore not filtered, whereas the air passing through the first fraction S1 of the inlet section 3 along arrow F3 is filtered.

FIGS. 4a, 4b, 4c, and 5 show a second embodiment. As in the first embodiment, the control means compress or extend the filter means in order to vary the size thereof along the first direction, depending on requirements, so as to modify the filtering power of the filter system.

In contrast, in the second embodiment, when the size of the filter means along the first direction is maximized, the filter means project beyond the inlet section. The filter means therefore cover an area that is greater than the area of the inlet section. The filter means then obstruct not only the inlet section, but also constitute a projection therefrom.

FIG. 4a is a diagrammatic section of the first variant of this second embodiment.

The filter means are shown in an intermediate position in which the filtering power of the filter system is moderate. The size L3 of the filter means in the first direction is longer than the length L4 of the inlet section in that direction.

More generally, the area covered by the top face 11" of the filter means is greater than the inlet area 2' of the inlet section.

The filter means then obstruct the entire inlet section. Nevertheless, since the filter means are not compressed, the filtering power of the filter means, and thus of the filter system, remains moderate.

If it is found necessary to increase the filter power, then as shown in FIG. 4b, the control means 13 exert a force on the free end to compress the filter means. Thereafter, the filter means continue to cover the entire inlet section, but they no longer project therefrom. The size L5 of the filter means in the first direction is equal to the length L4 of the inlet section.

Consequently, since the filter means are compressed, the filtering power of the filter system is increased.

Figure 4C:
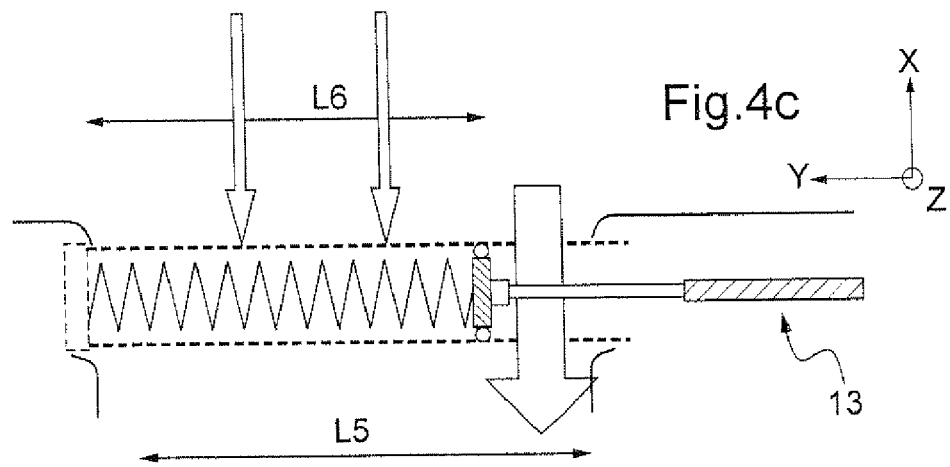

Finally, and as shown in FIG. 4c, it remains possible to reduce the size L6 of the filter means so as to open the inlet section in part or completely, should that be necessary.

With reference to FIG. 5, the second variant also applies to the second embodiment.

Unlike the first embodiment described in FIGS. 3a and 3b, a structural element 100 partially obstructs the inlet section 30.

It can thus be seen that in the intermediate position, the size L2 of each portion of the filter means along the curved first direction Y' is greater than the length L1 of the portion of the inlet section 30 in register with the portion of the filter means.

Figure 6:
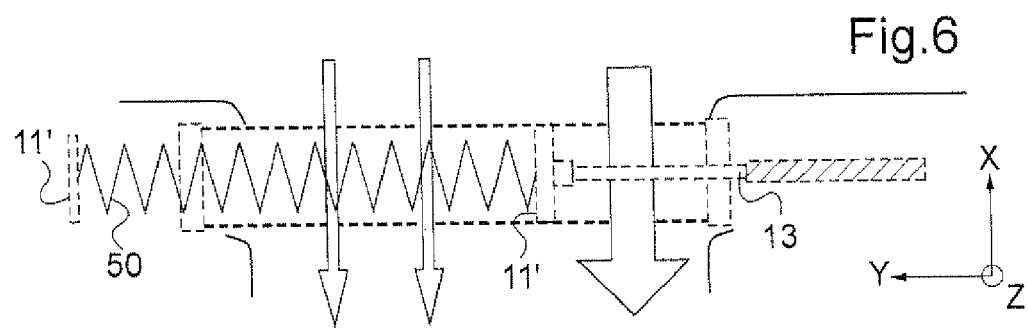
FIG. 6 is a view of an air intake in a third embodiment.

FIG. 6 is a diagrammatic view of a third embodiment.

In this embodiment, the control means 13 move the filter means along a first direction Y without changing the shape thereof. The filter means are neither compressed nor extended.

The distal end of the filter means is no longer fastened to a fairing. Consequently, the force exerted by the control means 13 gives rise to controlled movement of the entire filter means.

In this context, FIG. 6 shows the filter means in a position in which a fraction of the inlet section is not obstructed by the filter means.

It can be understood that the second variant of the invention can also be applied to this third embodiment.

Figure 7:
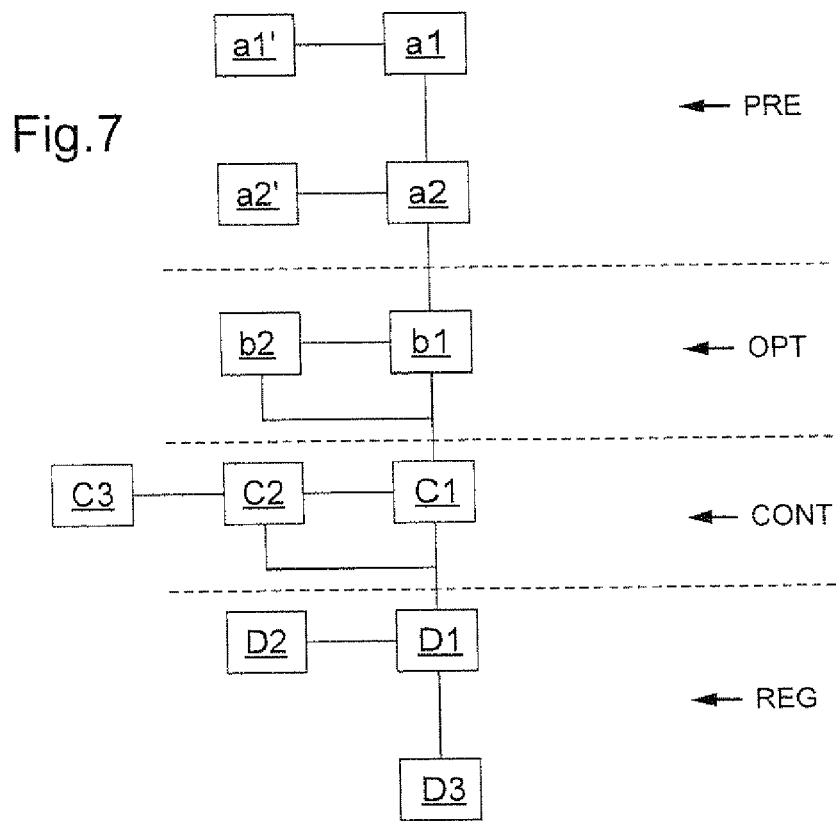
FIG. 7 is a diagram explaining the method of the invention.

FIG. 7 is a diagram explaining the various stages in the method implemented so as to enable monitoring means (not shown in the figures) to control the filtering power of the filter system as a function of requirements.

During a step a1) of an optional preliminary stage PRE, the means determine whether the engine installation of the aircraft is in "one engine inoperate" (OEI) mode.

On twin-engine helicopters, when one of the two turbine engines fails, it is possible to activate OEI mode so that the remaining engine delivers sufficient power to compensate for the loss of power from the other engine.

Consequently, if OEI mode is activated, during a step a1') the monitoring means cause the control means to minimize the filtering power of the filter system. The control means then act on the filter means so that they do not obstruct the inlet section of the air intake at all, thereby maximizing the rate at which air is delivered to the turbine engine.

Otherwise, during a step a2), the monitoring means determine whether the filter system is in manual mode.

During a step a2'), manual mode involves the pilot adjusting the position of the filter means (e.g. by using a potentiometer) and thus adjusting the filtering power of the filter system.

If not in manual mode, the monitoring means implement an optional stage OPT.

During a step b1) of this optional stage OPT, the monitoring means receives an icing signal coming from an icing sensor. If this signal informs the monitoring means that the aircraft is flying under icing conditions, then the monitoring means turns on the heater means for heating the grids of the guide means during a step b2).

Following this optional stage, the monitoring means can begin an optional inspection stage CONT. This inspection stage CONT seeks to avoid making use of filter means that have become clogged.

During a step C1), the monitoring means receive a clogging signal delivered by a clogging sensor.

It should be observed that the clogging sensor, like the icing sensor, may be constituted by a device that serves to measure the head loss generated by the filter means. As a result of head loss, and knowing the position of the filter means, the monitoring means can deduce that the filter means are clogged.

During a step C2), the monitoring means cause the control means to move the free end of the filter means along the first direction one way and then the opposite way.

The impact generated by this go-and-return movement may then possibly unclog the filter means.

Nevertheless, if after some predetermined number of go-and-return movements, e.g. five iterations, the filter means remains clogged, the monitoring means implements a step C3) causing the control means to minimize the filtering power of the filter system by fully opening the inlet section.

Finally, the monitoring means implements the essential stage of the method, i.e. the adjustment stage REG in which the filtering power of the filter system is adjusted.

During a step D1), the monitoring means evaluate the presence of particles in the air with the help of information relating to at least one monitoring parameter delivered by at least one sensor.

Each monitoring parameter is selected from the following first list, comprising:
  the size of the particles contained in the air upstream from the filter means;
  the number of particles contained in the air upstream from the filter means;
  the size of the particles contained in the air downstream from the filter means;
  the number of particles contained in the air downstream from the filter means; and
  the head loss generated by the filter means.

Depending on the information received, such as the number of particles contained in the air upstream from the filter means being greater than said predetermined number, the monitoring means can be caused to order an increase or a decrease in the filtering power of the filter means as a function of at least one adjustment parameter.

Thus, in order specifically to determine the filtering power that is to be reached in some particular situation, during a step D2), the monitoring means receives information relating to at least one adjustment parameter selected from the following list that comprises:
  the size of the particles that can be accepted by the turbine engine;
  the atmospheric conditions outside the aircraft, such as the outside air pressure, the outside air temperature, and the altitude of the aircraft; and
  the health of the turbine engine, such as the estimated service life remaining for the turbine engine.

For example, if the number of particles contained in the air upstream from the filter means is greater than a predetermined number, but if the size of particles that can be accepted by the turbine engine is greater than the size of the particles contained in the air, the monitoring means will cause the control means to minimize the filtering power of the filter system.

Naturally, the present invention can be subjected to numerous variants concerning its implement. Although several embodiments are described above, it will readily be understood that it is not conceivable to identify exhaustively all possible embodiments. It is naturally possible to envisage replacing any of the means described by equivalent means, without thereby going beyond the ambit of the invention.

What is claimed is:

1. An air intake having a passage for guiding incident air to an aircraft turbine engine, said air intake being provided with an inlet section through which air penetrates into said passage, and being provided with a filter system, wherein the filter system is provided with foldable filter means arranged at the inlet section of the passage, said filter system including control means that exert a force in a first direction on a free end of said foldable filter means for compressing or relaxing said filter means during operation in order to vary the dimension of said filter means to adjust the filtering power of the filter system, guide means of the filter system serving to guide the movement of the free end induced by said control means.

2. An air intake according to claim 1, wherein said control means are arranged outside said passage.

3. An air intake according to claim 1, wherein said first direction presents an angle lying in the range 75 degrees to 125 degrees relative to a second direction along which air passes through said inlet section.

4. An air intake according to claim 1, wherein said foldable filter means comprise a plane filter having fibers, said plane filter being concertina-folded so that the size of the foldable filter means along said first direction can be varied.

5. An air intake according to claim 1, wherein said guide means comprise at least one grid placed upstream from the filter means relative to the flow direction of air through the filter system.

6. An air intake according to claim 5, wherein said filter system is provided with heater means for heating said grid.

7. An air intake according to claim 1, wherein said control means compress or extend the filter means to vary the size thereof along said first direction, as a function of requirements.

8. An air intake according to claim 7, wherein, when said size is maximized, the filter means project beyond the inlet section.

9. An air intake according to claim 1, wherein said filter means are contained in a plane, wherein said control means comprise at least one actuator arranged in said plane to exert a force on the filter means along said first direction.

10. An air intake according to claim 1, wherein said filter means comprise at least one filter portion describing a circular arc.

11. An air intake according to claim 10, wherein said control means comprise an actuator and a hoop secured to the free end of each filter portion of the filter means, said actuator being suitable for imparting a turning movement to said hoop about its center of rotation.

12. An air intake having a passage for guiding incident air to an aircraft turbine engine, the air intake being provided with an inlet section through which air penetrates into the passage, and being provided with a filter system, wherein the filter system is provided with a foldable flexible filter arranged at the inlet section of the passage, the filter system including an actuator capable of exerting a force in a first direction on a free end of the foldable flexible filter for compressing or relaxing the filter during operation in order to vary the dimension of the filter along the first direction to adjust the filtering power of the filter system, and a guide disposed on the air intake adjacent the foldable filter to guide the movement of the free end of the filter induced by the actuator.

13. An air intake having a passage for guiding incident air to an aircraft turbine engine, the air intake being provided with an inlet section through which air penetrates into the passage, and being provided with a filter system, wherein the filter system is provided with a folded filter arranged at the inlet section of the passage and having a free end, the filter system including an actuator capable of exerting a force in a first direction on the free end of the folded filter during operation for varying the dimension of the filter along the first direction within the inlet section to adjust the filtering power of the filter system, and a first guide grid disposed on the air intake adjacent and outboard the filter to guide the movement of the free end of the filter along the first direction induced by the actuator.

14. An air intake according to claim 13 further comprising a second guide grid disposed on the air intake adjacent and inboard the filter such that the filter is disposed between the guide grids.

* * * * *